(12) United States Patent
Momosaki

(10) Patent No.: US 6,658,974 B2
(45) Date of Patent: Dec. 9, 2003

(54) GLASS SHEET CUTTING TOOL

(75) Inventor: Mitsukazu Momosaki, Fukuoka (JP)

(73) Assignee: NAO Enterprise, Inc., Wyckoff, NJ (US)

( * ) Notice: Subject to any disclaimer, the term of this patent is extended or adjusted under 35 U.S.C. 154(b) by 0 days.

(21) Appl. No.: 09/950,990

(22) Filed: Sep. 13, 2001

(65) Prior Publication Data

US 2003/0047048 A1 Mar. 13, 2003

(51) Int. Cl.[7] .................................................. B26D 7/08
(52) U.S. Cl. ......................... 83/169; 83/83; 83/886
(58) Field of Search ....................... 83/879–887, 169; 225/96, 96.5

(56) References Cited

U.S. PATENT DOCUMENTS

| | | | | |
|---|---|---|---|---|
| 2,750,674 A | * | 6/1956 | Lee ............................ 33/32.3 |
| 3,673,900 A | * | 7/1972 | Jendrisak et al. ............. 83/884 |
| 3,742,793 A | * | 7/1973 | Gray et al. .................... 83/881 |
| 3,850,063 A | * | 11/1974 | Witkowski .................... 83/886 |
| 4,070,936 A | * | 1/1978 | Duncan ........................ 83/861 |
| 4,110,907 A | * | 9/1978 | Einhorn et al. ........... 30/164.95 |
| 4,287,669 A | * | 9/1981 | Arai ........................... 30/123.3 |
| 4,451,981 A | * | 6/1984 | Kaniarz ...................... 30/123.3 |
| 4,541,176 A | * | 9/1985 | Croce ....................... 30/164.95 |
| 5,381,713 A | * | 1/1995 | Smith .......................... 83/881 |

\* cited by examiner

Primary Examiner—Allan N. Shoap
Assistant Examiner—Isaac Hamilton
(74) Attorney, Agent, or Firm—Weingram & Associates, P.C.

(57) ABSTRACT

A glass sheet cutting tool prevents wasted lubrication and includes a cutting section, an oil introduction section and an oil storage section established along a common line. An open section and an opening and closing tap section are established along another common line that orthogonally crosses the first.

4 Claims, 7 Drawing Sheets

GLASS SHEET CUTTING TOOL

BACKGROUND OF THE INVENTION

1. Field of the Invention

The invention relates to a glass plate cutting tool.

2. Description of the Prior Art

Previously, glass cutting tools for cutting glass plate, included an oil introduction section which lubricated the cutting section, an oil storage section for oil collected to supply the oil introduction section, and an open section for supplying oil to the oil storage section, and an opening and closing tap section for opening and closing the open section.

Further, the cutting section, oil introduction section, oil storage section, open section and opening and closing tap section were disposed along straight lines.

The previous opening and closing tap section was left somewhat open when a glass sheet cutting operation was performed, the air and stored oil passed through, and the cutting operation was performed in that state.

Thus, the oil was not introduced from the oil introduction section to the cutting section as a result of decreasing pressure within the oil storage section such that there was no lubricating oil at the cutting section.

Further, the above-mentioned glass cutting tools had additional problems such as the following.
1. There was wasted lubrication as oil was excessively supplied to the oil storage section and oil introduction section and cutting section during glass sheet cutting.
2. Oil flowed out from the opening and closing tap that was left somewhat open when the glass sheet cutting tool was positioned horizontally on an unprepared glass sheet.
3. Oil dropped from the oil storage section and oil introduction section and cutting section which were positioned on almost the same straight line when oil was supplied through the open section to the oil storage section.

OBJECTS AND SUMMARY OF THE INVENTION

Thus, this invention offers a glass sheet cutting tool which is equipped with a cutting section that cuts a glass sheet, an oil introduction section that introduces oil for lubricating the cutting section, an oil storage section where oil collects for supplying oil to the oil introduction section, an open section for supplying oil to the oil storage section, and an opening and closing tap section that is established for opening and closing the open section. The cutting section and the oil introduction section and the oil storage section are disposed on or near an imaginary straight line, along with the open section and the opening and closing tap section which are disposed on or near another straight line which almost orthogonally crosses the above-mentioned first imaginary straight line.

Further, this invention is characterized by the establishment of an air connection valve for connecting the oil storage section with air in the opening and closing tap section; and, along with holding the oil storage section, the opening and closing tap section is positioned near the fingertips of the holding hand, and the operable air connection valve is coaxially established at the fingertips for the same opening and closing tap.

DETAILED DESCRIPTION OF THE INVENTION

Figure 1:
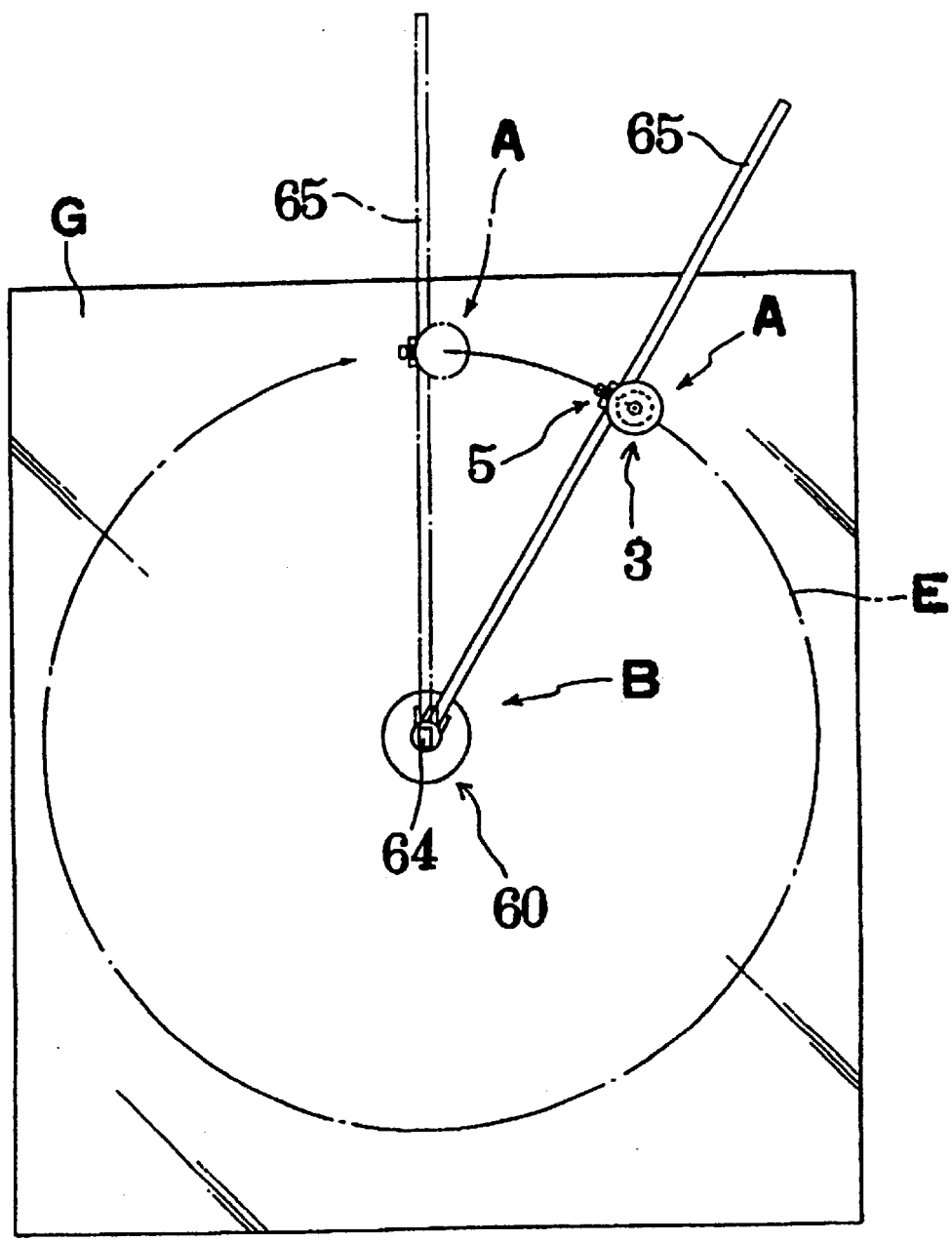
FIG. 1 is a plan view explanatory diagram that shows a glass sheet cutting tool used according to the present invention.

As a basic construction, the glass sheet cutting tool of this invention includes a cutting section that cuts a glass sheet, an oil introduction section that introduces oil for lubricating the cutting section, an oil storage section that collects oil for supplying oil to the oil introduction section, an open section that is open for supplying oil to the oil storage section and an opening and closing tap section for opening and closing the open section.

The glass sheet cutting tool, has a cutting section and an oil introduction section and an oil storage section established on or near a first imaginary straight line. An open section and an opening and closing tap section are established on or near another imaginary straight line which almost intersects the above-mentioned first imaginary straight line.

Thus, when a glass sheet is cut, with the opening and closing tap section in a closed state and holding the oil storage section with the cutting section on the glass sheet in a covered state, the cutting section presses down on the glass sheet and the glass sheet can be cut by pushing and pulling the cutting section in the cutting direction.

At this time, the oil flows to the oil storage section and oil introduction section and cutting section, and there is smooth and accurate cutting.

When there is no oil flow to the cutting section, the oil storage section is connected with air by opening the opening and closing tap. Pressure increases in the storage section which is in a decreased pressure state, and there is a smooth oil flow. The result is that lubrication to the cutting section can be done as is desired.

Further, oil supply to the cutting section is not excessive and wasted lubrication can be prevented.

Also, the glass cutting tool oil does not flow out since the opening and closing tap is closed even if somewhat horizontally positioned on the glass sheet.

Further, when the oil supply to the oil storage section from the open section occurs and when the open section is facing in an upward direction, the supply of oil is difficult with the opening and closing tap section opened. The cutting section and the oil introduction section and the oil storage section are then in a horizontal direction on or near the same imaginary straight line, and oil dropping from the cutting section can be prevented.

Further, an air connection valve is established for connecting the oil storage section with the air in the opening and closing tap section.

Therefore, the cutting operation is not interrupted by operating the air connection valve even during operation while a glass sheet is being cut, and cutting operations can be performed with desirable efficiency.

Further, along with holding the oil storage section, the opening and closing tap is positioned near the fingertips of the holding hand for use when the cutting section is pressed down on a glass sheet, and the operable air connection valve at the fingertips is established coaxially with the opening and closing tap section.

Further, along with being easily performed, the cutting operation is not interrupted since the fingertips of the hand holding the oil storage section can operate the air connection valve, and the construction of the glass sheet cutting tool can be simply compacted while the same cutting operation can be smoothly and continuously performed.

Figure 2:
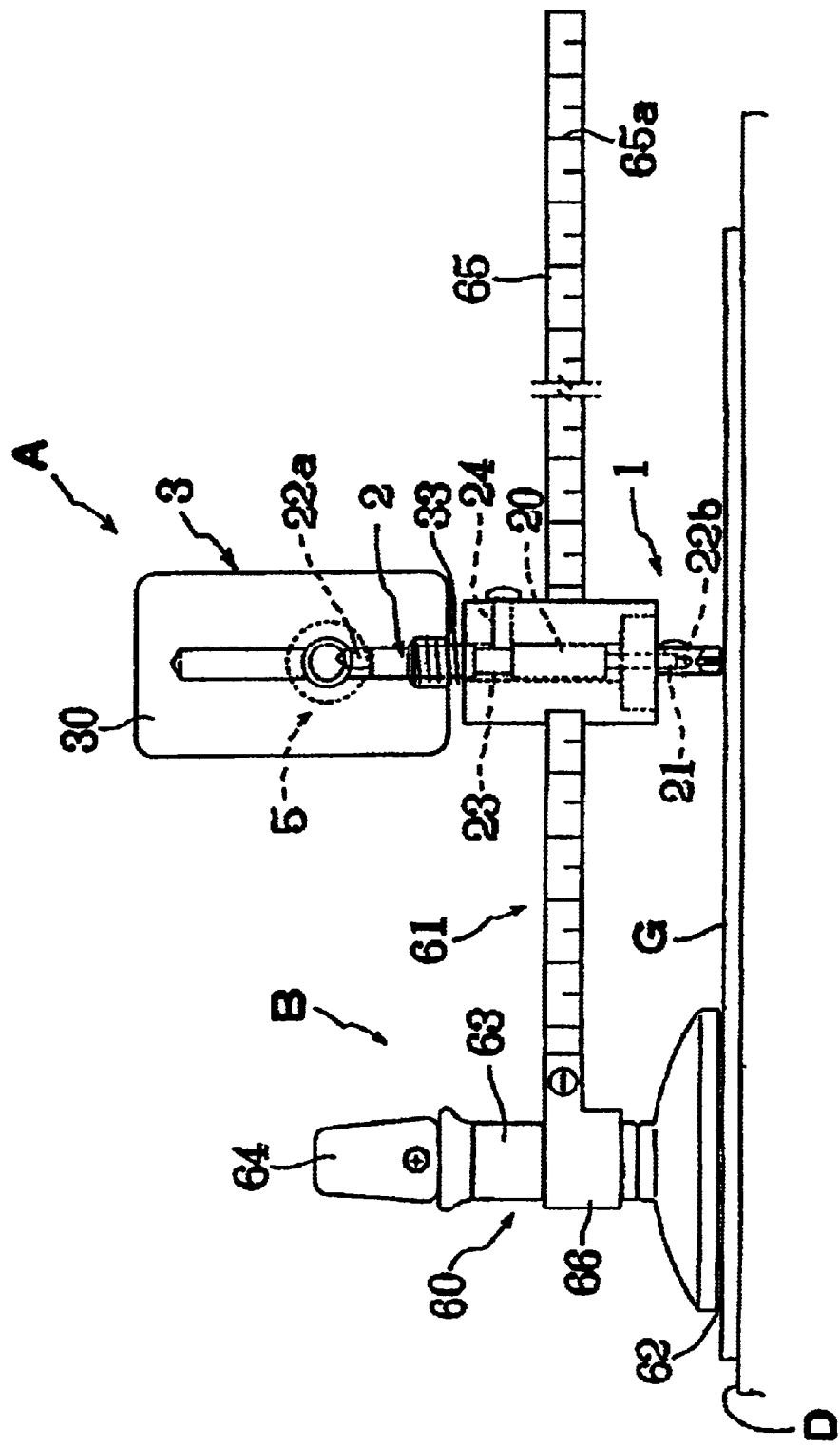
FIG. 2 is a front view explanatory diagram that shows the glass sheet cutting tool.

As is shown in FIGS. 1 and 2, a glass sheet cutting tool A is established as freely detachable on an auxiliary cutting tool B, and a glass sheet G can be cut in a circle by using the auxiliary cutting tool B together with cutting tool A.

Figure 5:
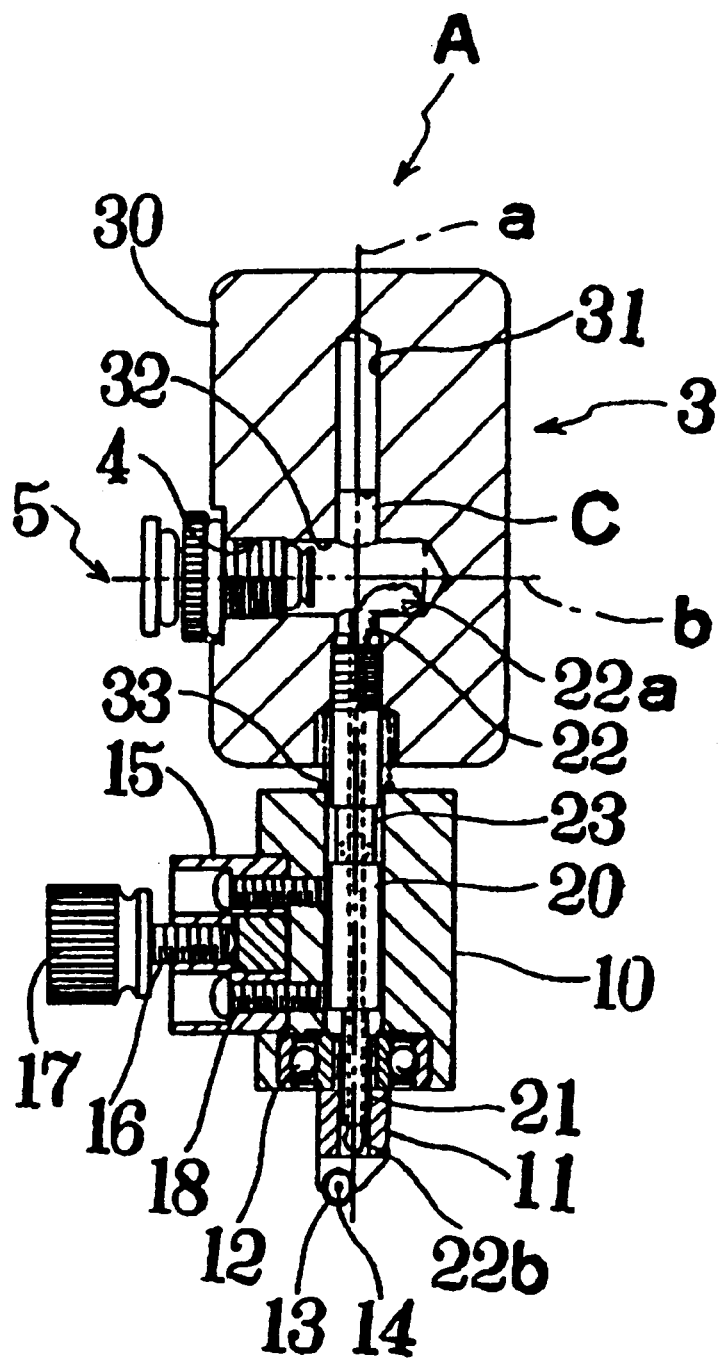
FIG. 5 is a cross-sectional side view of the glass sheet cutting tool.
Figure 6:
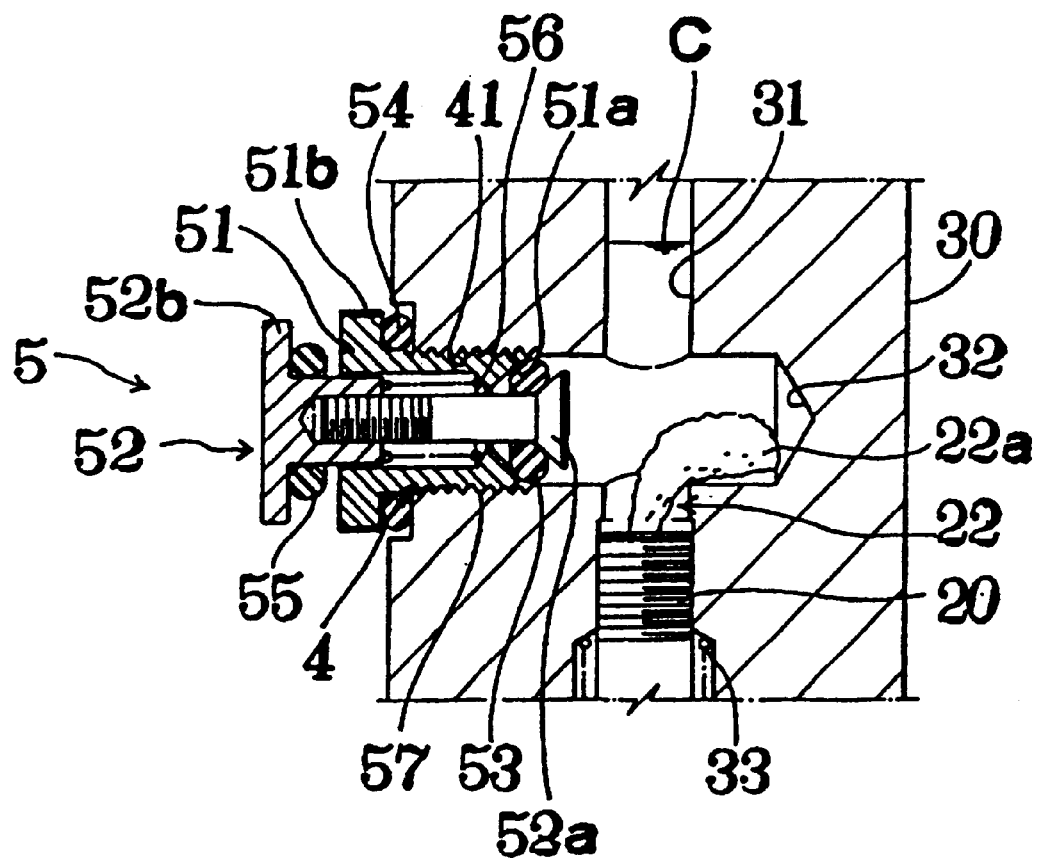
FIG. 6 is an enlarged cross-sectional side view of an opening and closing tap of the glass sheet cutting tool.

Further, glass sheet cutting tool A is equipped with a cutting section 1 which cuts a glass sheet G, an oil introduction section 2 that introduces the oil C, as shown in FIG. 5, lubricating the same cutting section 1, an oil storage section 3 that collects the oil C for supplying oil to the oil introduction section 2, an open section 4, as shown in FIG. 5 that is open for supplying oil to oil storage section 3, and an opening and closing tap section 5 that is established for opening and closing the open section 4. D is a work stand.

Further, the cutting section 1 and the oil introduction section 2 and the oil collecting section 3 are disposed on almost the same imaginary line a, as shown in FIG. 5, along with the open section 4 and the opening and closing tap 5 which are disposed on imaginary line b which is substantially orthogonal to imaginary line a.

Figure 3:
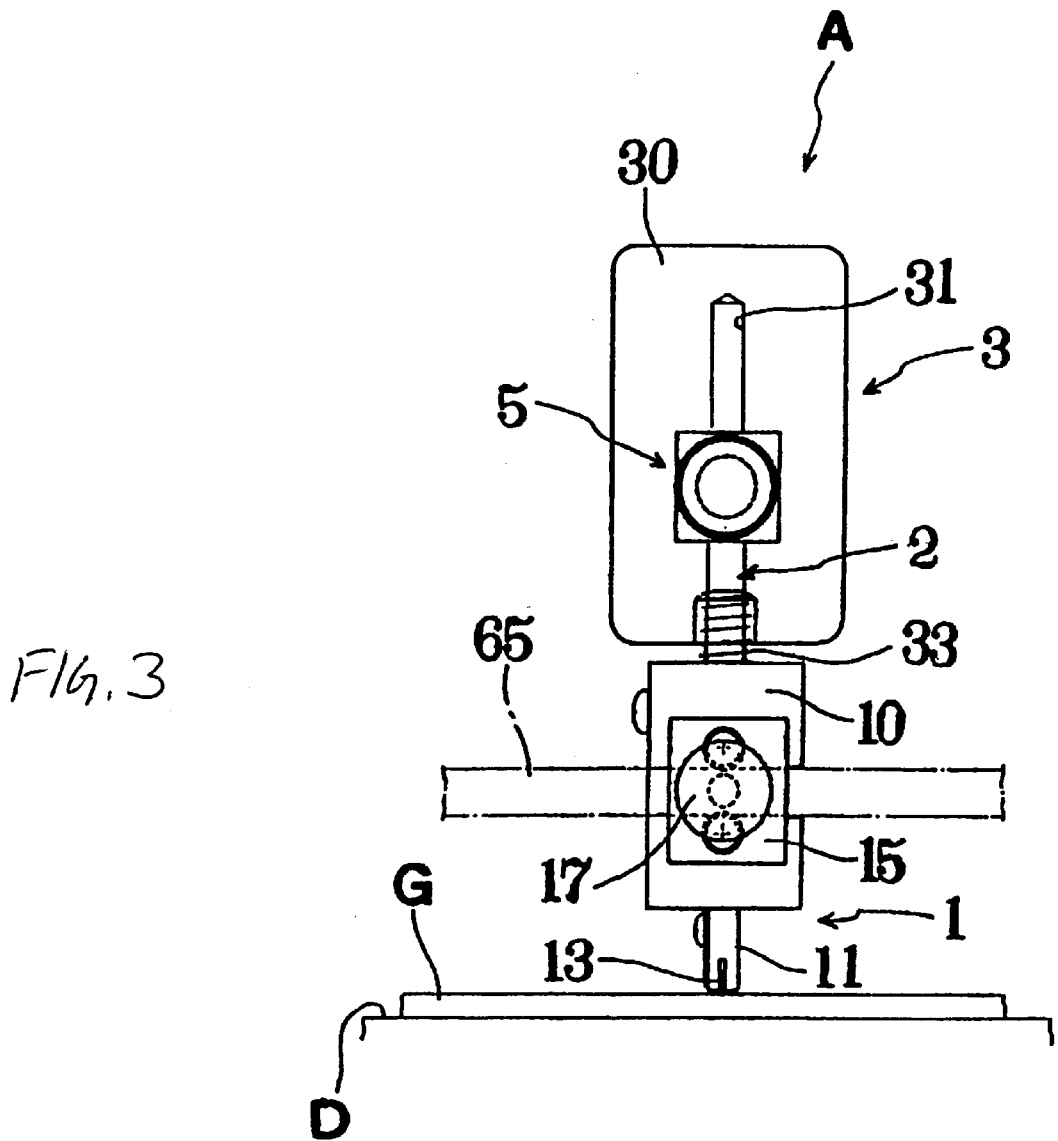
FIG. 3 is a rear view of the glass sheet cutting tool.
Figure 4:
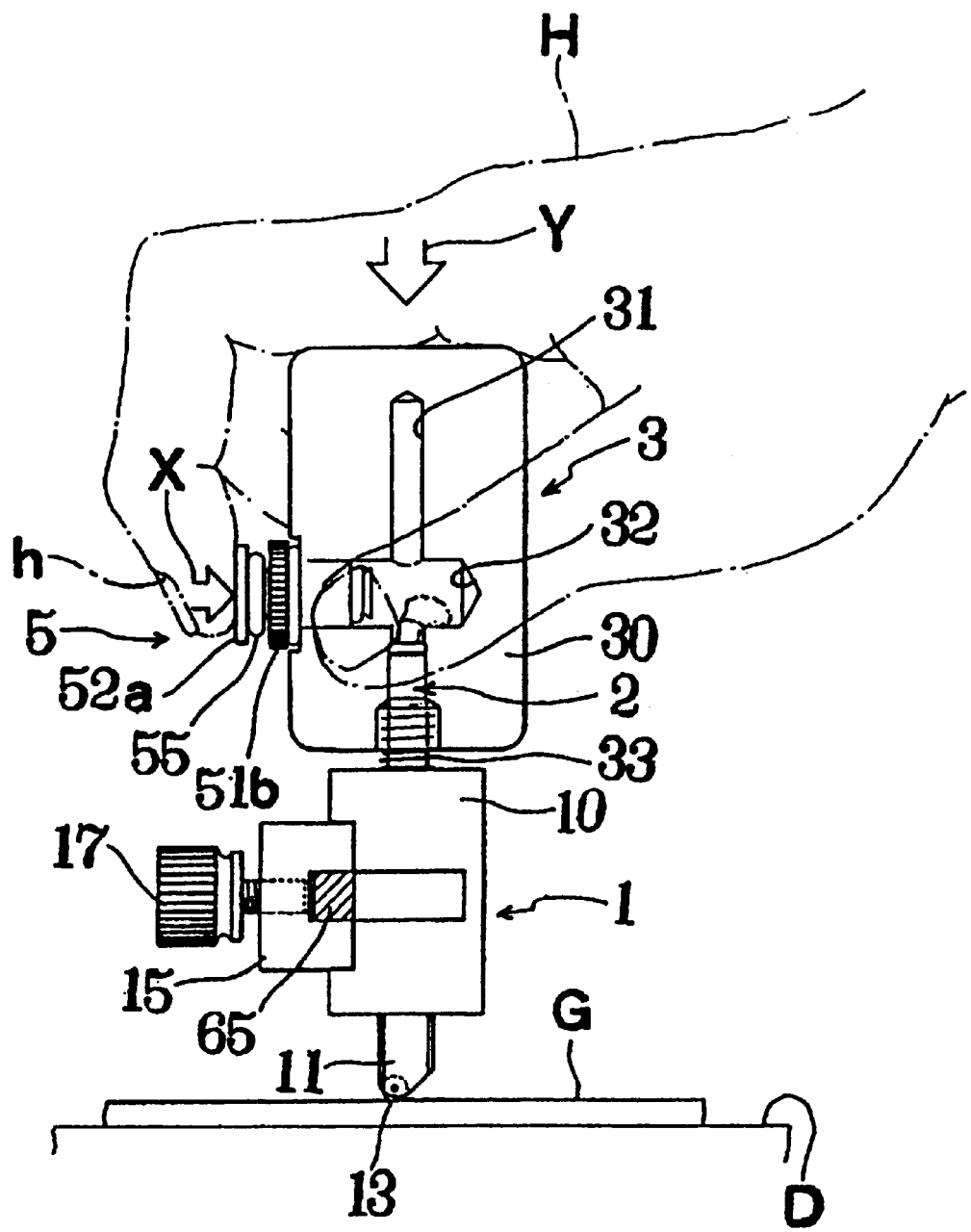
FIG. 4 is a side view explanatory figure of the glass sheet cutting tool.

The cutting section 1 is established as being coaxially freely rotatable by means of the cylindrical rotating blade support piece 11, and bearing 12 at the lower end section of the cylindrical support 10 that is directed on the axis in a vertical direction, as shown in FIG. 3–FIG. 5; and, the super alloy type rotating blade 13 is established as freely rotating by means of rotating blade support shaft 14 at the lower end of the rotating blade support piece 11.

Further, the rotating blade support shaft 14 is directed on the axis in the direction which orthogonally crosses the axis of the cylindrical support 10 and the rotating blade support piece 11, and both axes are established as mutually offset. Further, the rotating blade support piece 11 also smoothly rotates while rotating blade 13 is rotating and a curved cut can be accurately carried out.

A fitting or installation piece 15 is established to accommodate the auxiliary cutting tool B on the surrounding wall of cylindrical support 10. Position determining and fixing screw 16 is formed in a direction that orthogonally crosses the axis of the cylindrical support 10 at the installation piece 15, and the position determining and fixing knob 17 freely loosens and tightens screw 16. 18 is an installation bolt.

The oil introduction section 2 has an oil pipe introduction case 20 that runs in a vertical direction and a small diameter pipe oil introduction case 21 formed below the same introduction case 20 which passes through the oil introduction unit 22. The oil flows by a capillary action which occurs in introduction cases 20, 21. A connecting small diameter section 23 is formed in the middle section of the oil introduction case 20, as shown in FIG. 3–FIG. 5.

Further, along with passing through the lower half of the oil introduction case 20 in cylindrical support 10 of the cutting section 1, the small diameter oil case 21 passes through into the rotating blade support piece 11 and through the upper half of the oil introduction case 20 in oil storage section 3.

Meshing piece 24 that is installed in the upper section of the cylindrical support 10 shown in FIG. 2, connects with small diameter section 23 and is for planned removal of oil introduction case 20.

In this instance, a chemical fiber is used as the oil introduction unit 22, but any suitable material that introduces oil C by capillary action can be used.

The oil storage section 3 has a main oil storage body 30 that is formed in a column shape from transparent material and a horizontal oil storage route 32 intersects with the vertical oil storage route 31 in the middle section. The vertical direction oil storage route 31 runs linearly from the lower end central section of the main oil storage body 30 to the upper section, and the oil C is collected in these oil storage routes 31, 32, as shown in FIG. 3–FIG. 6.

The upper half of oil introduction case 20 passes through into the lower half of the vertical oil storage route 31, and the upper end section 22a of the oil introduction unit 22 projecting from oil guide case 20 extends into the horizontal oil storage route 32 and is submerged in oil C.

Also, the oil storage main body 30 can improve the aesthetic sense while being able to observe the remaining amount of oil C by the color in the oil storage routes 31, 32 since they are formed by transparent materials.

A return use spring 33 is established by winding around the outer surface of the oil introduction case 20 between the oil storage main body 30 and the cylindrical support 10.

An open section 4 is formed at one end of the horizontal oil storage route 32 of oil storage section 3 opening to the surrounding surface of the oil storage main body 30, such as shown in FIG. 3–FIG. 6.

The opening and closing tap 5 is freely removable by screwing of the cylindrical tap main body 51 with a male screw section 57 formed on the outer surface for the female screw section 41 that is formed at the inner surface of the open section 4. Also, an air connection valve 52 passes through into the cylindrical tap main body 51 as shown in FIG. 3–FIG. 6.

Further, a first packing ring 53 is established between the valve main body 52a which is formed at the front end section of the air connection valve 52 which is formed at the front end section of the air connection valve 52 and the valve seat 51a that is formed on the front end of the cylindrical tap main body 51. A second packing ring 55 is established between the knob use collar 51b that is formed on the base end of the cylindrical tap main body 51 and the outer surface of the oil storage main body 30. A third packing ring 55 is established between a manual pressure operated piece 52b that is formed on die base end section of the air connection valve 52 and the knob collar 51b.

Further, a valve closing spring 56 which flexibly triggers the air connection valve 52 in the valve closing direction is established in the cylindrical tap 51, and the valve main body 52a is closed by the loosening of the first packing ring 53 at valve seat 51a by the valve closing spring 56.

Further, the pressure operated piece 52b is opposed by the resilient triggering force of the valve closing spring 56.

The valve main body 52a can be shut by the pressing operation and air can be easily connected within the horizontal direction oil storage route 32.

Further, the open section 4 can be opened by removing the cylindrical tap 51 that screws into the oil storage main body 30, and the oil C can be supplied from the same open section 4 to the oil storage main body 30.

In this use, the air connection valve 52 is disposed near the fingertip of the index finger h positioned by holding hand H above the oil storage main body 30 and the pressure operated piece 52*b* of the air connection valve 52 can be easily operated by the fingertip of the index finger h, as shown in FIG. 4.

Next, the auxiliary cutting tool B is equipped with a rotating center fixed section 60 and a rotating arm section 61 that freely rotates with the base end section pivoting at the same rotating center fixed section 60 as shown in FIG. 1 and FIG. 2 which explain the auxiliary cutting tool B.

Further, the rotating center fixed section 60 is comprised of an attachable suction cup 62 for glass sheet G, an axis 63 that is vertically established in the center of the suction cup 62, and a suction cup operating piece 64 that is established at the upper end of the same axis 63.

The rotating arm section 61 is formed from a rod shape rotating arm main body 65 that runs in the horizontal direction and a pivot piece 66 formed on the base end section of the rotating arm main body 65. The pivot piece 66 is formed in a ring shape and the rotating arm main body 65 rotates around axis 63 by being freely rotationally fitted on the outer surface of the axis 63.

Further, a scale 65*a* is formed on the side surface of the rotating arm main body 65. Positioning of fitting and installation piece 15 or cutting section 1 is performed by matching with the scale 65*a*. The glass sheet cutting toil A is installed on the rotating arm main body 65 by pressing the knob attached male screw 17.

Examples of processes for cutting a glass sheet G in a circle using the glass sheet cutting tool A and auxiliary cutting tool B are explained below while referring to FIG. 1, FIG. 2 and FIG. 4.

The rotating center fixed section 60 of auxiliary cutting tool B is established in a set position on glass sheet G.

Suction cup 62 is attached to glass sheet G by operating the suction cup control piece 64.

The glass cutting tool A is desirably matched by the scale 65*a* and attached on the rotating arm main body 65.

The oil storage main body 30 is pressed and attached from above downward in the Y direction, and the glass sheet G is cut in a circle E by rotating blade 13 by turning the rotating arm main body 65 for 360 degrees at the center at the axis 63 as shown in FIG. 2.

Thus, the oil C can be poured on the rotating blade 13 by the lower end section 22*b* of the oil introduction unit 22 connected to the rotating blade 13 by the oil introduction section 2 also moving down when the oil storage main body 30 is pressed in the downward Y direction.

Further, the oil introduction unit 22 connects to introduce the oil C within the vertical and horizontal oil storage routes 31, 32 when oil C is poured on the rotating blade 13 and the oil C within the vertical oil storage route 31 becomes decreased. The amount of oil C that is introduced by unit 22 is then decreased.

Further, the pressure operated piece 52*b* of the air connection valve 52 that is disposed in the opening and closing tap 5 opens the valve main body 52*a* in the X direction which orthogonally crosses the downward Y direction when pressed and operated by the index finger h of hand H. The air and the horizontal oil storage route 32 are connected and there is increased pressure within the vertical direction oil storage route 31 and a decreased pressure in the connection to the horizontal oil storage route 32.

The amount of oil in the oil introduction unit 22 can then be returned to a standard amount of oil.

Further, the pressing operation by the index finger h can be easily performed in response to need during the cutting of glass sheet G while there is rotational movement by holding the oil storage main body 30.

The air connection use valve 52 can be automatically returned to the closed state by the valve closing spring 56 when the index finger h is removed from the pressure operated piece 52*b* and the oil C does not overflow.

The glass sheet cutting tool A is removed from the rotating arm main body 65 when the oil C is supplied to the glass sheet cutting tool A. The opening and closing tap section 5 is in a horizontal direction facing upward, open section 4 is opened by the cylindrical tap main body 51 of the opening and closing tap section 5 being removed from the oil collecting main body 30, and the oil C can be supplied by the same open section 4.

Here, the oil introduction section 2 is without oil C dropping from the front end by facing in an almost horizontal direction.

Further, the pressure operated piece 52*b* is such as being easily operated by an index finger h in this actual example, but is not limited to the index finger and the established position can be freely operated by other fingers.

Figure 7:
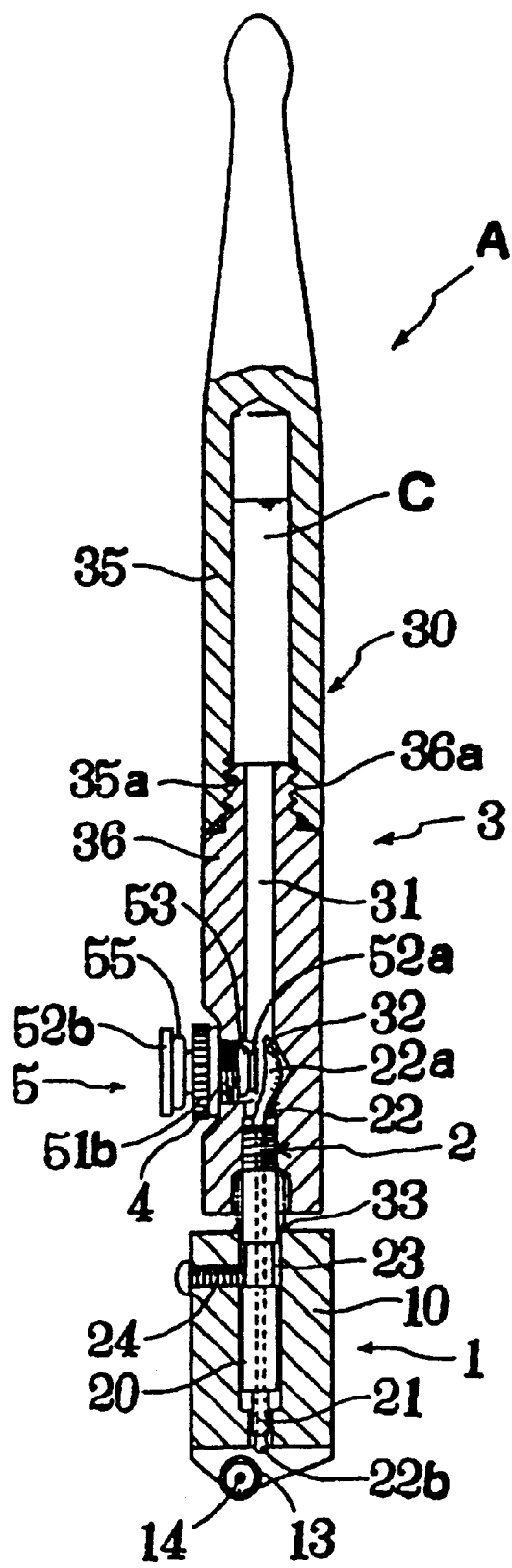
FIG. 7 is a side view of another glass sheet cutting tool.

FIG. 7 shows another glass sheet cutting tool A as an example. The basic construction is the same as the previous glass sheet cutting tool A, but differs at the points of the oil storage main body 30 being of a long thin form and being held as a pen. The same glass sheet G can be cut by rotating blade 13 pushed onto glass sheet G and pulled.

Thus, when the oil storage main body 30 is held, the pressure operated piece 52*b* of the opening and closing tap section 5 is established near the index finger h, and can be easily pushed and operated by index finger h.

The glass sheet cutting tool A is also positioned horizontally and oil C does not overflow due to the open section 4 being normally closed by the opening and closing tap section 5.

Further, the oil storage main body 30 has the upper half 35 and lower half 36 formed in two parts along with a female screw 35*a* formed on the inner surface in the lower half of the upper half 35 and a male screw 36*a* formed on the outer surface on the upper end section of the lower half 36. The female screw 35*a* is screwed onto the same male screw 36*a*, and the upper half 35 is freely detachable from the lower half 36.

Further, the oil C can be supplied within the vertical direction oil storage route 31 that is formed within the upper half 35 by the upper half 35 being detached from the lower half 36.

Effects of the Invention

The following effects are obtained by the present invention. The invention has a cutting section and an oil introduction section and an oil storage section positioned on or near a first imaginary line, along with an open section and an opening and closing tap section established about a second imaginary line which almost orthogonally crosses the first imaginary line.

Thus, along with the oil storage section being held and the cutting section for glass being in a covered state when a glass sheet is cut, a glass sheet can be cut by pushing and pulling the cutting section in the cutting direction by pressing the cutting section to the glass sheet.

Further, oil pours into the oil storage section and oil introduction section and cutting section and there is smooth and accurate cutting.

Further, air is connected with the oil storage section by opening the opening and closing tap section when oil flow in the cutting section is decreased. The oil collecting section, which is in a decreased pressure state, is then pressurized so that the oil flow can be smooth, and the effect is a desirable lubrication of the cutting section.

Further, the supply to the cutting section is not in excess and wasted lubrication can be prevented.

Also, the glass sheet cutting tool is positioned horizontally to the glass sheet in the unutilized state, and the opening and closing tap section is closed, to prevent oil outflow.

Also, the cutting section and oil introduction section and oil storage section are in a horizontal state disposed on or near the same imaginary straight line and oil dropping from the cutting section can be prevented when oil supply to the oil storage section from the open section occurs when the open section faces upward.

The invention includes an air connection valve disposed in an opening and closing tap section for connecting an oil collecting section with air.

Thus, the cutting operation is not interrupted and the cutting operation can be desirably and efficiently performed by operating the air connection valve during the operation of cutting a glass sheet.

The present invention includes an opening and closing tap positioned adjacent the fingertips of a holding hand, and the operable air connection valve is coaxially disposed at the fingertips to the same opening and closing tap section along with the oil storage section being held in a state for utilization by the cutting section pressing on the glass sheet.

Thus, cutting operations are not interrupted and can be performed smoothly, since the air connection valve can be operated by the fingertips of the hand that is holding the oil storage section, while the construction of the glass sheet cutting tool can easily continue.

What is claimed is:

1. A glass plate cutting tool comprising:

a cutting section that cuts glass plate, an oil introduction section that introduces oil for lubricating the cutting tool, an oil storage section for storing and supplying oil to said oil introduction section, an open oil supply section which is open for supplying oil to said oil storage section, and an opening and closing tap section that is positioned to control the opening and closing of said open oil supply section;

said cutting section, oil introduction section and oil storage section being substantially disposed along a first, central longitudinal axis said open oil supply section and opening and closing tap section being substantially disposed along a second longitudinal axis that crosses said first axis in a substantially orthogonal relationship;

and said opening and closing tap section is spaced from said first axis.

2. A glass plate cutting tool as described in claim 1 including an air connection valve disposed coaxially within said opening and closing tap section connecting said oil storage section with the open air.

3. The glass plate cutting tool of claim 2 wherein said opening and closing tap section includes manually operable resilient triggering means, with said cutting section being positioned for pressing on the glass plate.

4. The glass plate cutting tool of claim 3 including an auxiliary tool releasably attachable to said glass plate and having a rotatable arm connecting to said cutting tool.

* * * * *